US008483751B2

(12) United States Patent
Black et al.

(10) Patent No.: US 8,483,751 B2
(45) **Date of Patent: *Jul. 9, 2013**

(54) SPLIT BAND DIVERSITY ANTENNA ARRANGEMENT

(75) Inventors: Greg Black, Vernon Hills, IL (US); Vijay Asrani, Round Lake, IL (US); Nicholas Matthew McDonnell, Schaumburg, IL (US); Deven Mohan Patel, Antioch, IL (US)

(73) Assignee: Motorola Mobility LLC, Libertyville, IL (US)

(*) Notice: Subject to any disclaimer, the term of this patent is extended or adjusted under 35 U.S.C. 154(b) by 919 days.

This patent is subject to a terminal disclaimer.

(21) Appl. No.: 12/505,040

(22) Filed: Jul. 17, 2009

(65) Prior Publication Data

US 2011/0014958 A1 Jan. 20, 2011

(51) Int. Cl.
*H04M 1/00* (2006.01)

(52) U.S. Cl.
USPC .................. 455/552.1; 455/575.1; 455/575.7; 343/702; 343/751

(58) Field of Classification Search
USPC ................. 455/552.1, 575.1, 575.7; 343/702, 343/751, 816, 853, 876
See application file for complete search history.

(56) References Cited

U.S. PATENT DOCUMENTS

| | | | | |
|---|---|---|---|---|
| 6,657,595 | B1 | 12/2003 | Phillips et al. | |
| 7,155,252 | B2 * | 12/2006 | Martin et al. | 455/553.1 |
| 2004/0266360 | A1 * | 12/2004 | Hamalainen et al. | 455/67.16 |
| 2008/0258982 | A1 * | 10/2008 | Black et al. | 343/702 |

FOREIGN PATENT DOCUMENTS

WO 03036817 A1 5/2003

* cited by examiner

*Primary Examiner* — Tuan H Nguyen

(57) ABSTRACT

A wireless communication device or a split band diversity antenna arrangement (10, 20, 30 or 41) has a first multi-band antenna (22 or 14) located at a bottom portion (11) of the wireless communication device and selectively coupled to a diversity receiver (26), a second multi-band antenna (24 or 12) located at a top portion (13) of the wireless communication device and selectively coupled to a dual band transceiver (28), a band splitter (25) splitting an input from the first antenna into a first output and a second output where the first output serves as an input to the diversity receiver, and a band combiner (27) that combines the second output of the band splitter with a signal from the second antenna to provide an input signal to the dual band transceiver.

19 Claims, 8 Drawing Sheets

20

21

50

80

SPLIT BAND DIVERSITY ANTENNA ARRANGEMENT

CROSS REFERENCE TO RELATED APPLICATIONS

U.S. patent application Ser. No. 12/505,044, entitled "Antenna Arrangement for Multimode Communication Device", and U.S. patent application Ser. No. 12/505,048, entitled "Customized Antenna Arrangement", both concurrently filed on Jul. 17, 2009 by the same Assignee herein.

FIELD OF THE DISCLOSURE

This invention relates generally to antennas, and more particularly to a multiband antenna operating on several distinct bands.

BACKGROUND

As wireless devices become exceedingly slimmer and greater demands are made for antennas operating on a diverse number of frequency bands, antenna configurations typically used for certain bands can easily interfere or couple with other antenna configurations used for other bands. Thus, designing antennas for operation across a number of diverse bands each band having a sufficient bandwidth of operation becomes a feat in artistry as well as utility, particularly when such arrangements must meet the volume requirements of today's smaller communication devices.

Another concern with antenna designs in general for multiband phones includes improved call drop antenna performance. Existing designs may have call drop issues that relate to loading on antennas caused by hand grips on a portion of the phone or caused by loading caused by a combination of hand grips and proximity to a head.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate the embodiments and explain various principles and advantages, in accordance with the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION

One embodiment of the present disclosure can entail a wireless communication device having a first antenna selectively coupled to a diversity receiver in a first band and to at least a dual band transceiver in a second band, a second antenna selectively coupled to at least the dual band transceiver, at least a first band splitter splitting an input from the first antenna into a first output and a second output where the first output selectively couples to the diversity receiver, and the second output selectively couples to at least the dual band transceiver.

Another embodiment of the present disclosure can entail a split band diversity antenna arrangement having a first multiband antenna located at a bottom portion of a wireless communication device and selectively coupled to a diversity receiver, a second multi-band antenna located at a top portion of the wireless communication device and selectively coupled to at least a dual band transceiver, a band splitter splitting an input from the first antenna into a first output and a second output where the first output serves as an input to the diversity receiver, and a band combiner that combines the second output of the band splitter with a signal from the second antenna to provide an input signal to at least the dual band transceiver.

Yet another embodiment of the present disclosure can entail a communication device having a split band diversity antenna arrangement and a communication circuit coupled to the antenna arrangement. The communication device can include a controller operable to cause the communication circuit to process signals associated with a wireless communication system where the split band diversity antenna arrangement includes a first antenna coupled to a diversity receiver optimized for operation in at least a lower band under a 1000 MHz range where the first antenna is located at a top portion of the communication device. The split band diversity antenna arrangement also includes a second antenna coupled to a dual band transceiver and designed and constructed to operate in at least a non-contiguous higher band than the first antenna where the second antenna is located remote from the first antenna and at a bottom portion of the communication device. The arrangement also includes a band splitter splitting an input from the first antenna into a first output and a second output where the first output serves as an input to the diversity receiver and a band combiner that combines the second output of the band splitter with a signal from the second antenna to provide an input signal to the dual band transceiver.

Figure 1:
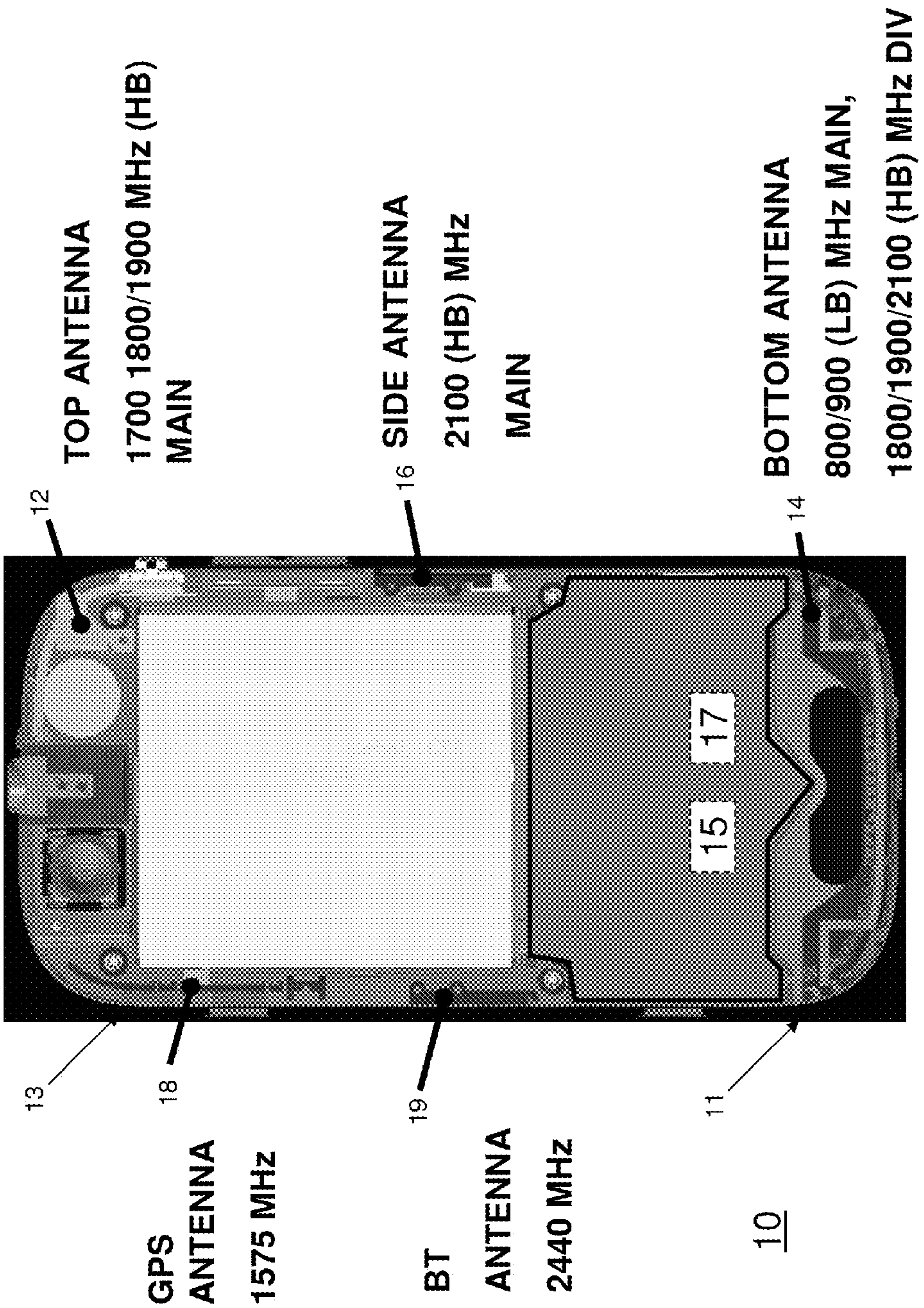
FIG. 1 depicts an embodiment of a communication device in accordance with the present disclosure.

FIG. 1 depicts an exemplary embodiment of the internal construction of a communication device 10. The communication device 10 comprises for example a multi-band or dual band antenna 14 at a bottom portion of the communication device 10 coupled to a communication circuit embodied as a transceiver 17, diversity receiver (not shown), and a controller 15. The antenna 14 can be operable to radiate or receive signals in lower bands such as the in the 850 and 900 MHz band ranges and can also be designed to receive signals in higher band ranges such as in the 1800 to 2100 MHz ranges. The antenna 14 can be coupled to a main transceiver 17 and to a diversity receiver (not shown, but see FIGS. 2-4). The communication device 10 can also include a multi-band antenna 12 at a top portion of the communication device coupled to a communication circuit (such as multi-band transceiver 17), where the antenna 12 can be designed to radiate or receive signals in higher bands ranging from 1700 to 2100 MHz. The transceiver 17 utilizes technology for exchanging radio signals with a radio tower or base station of a wireless communication system according to common modulation and demodulation techniques. Such techniques can include, but are not limited to GSM, TDMA, CDMA, WiMAX, WLAN among others. The controller 15 utilizes computing technology such as a microprocessor and/or a digital signal processor with associated storage technology (such as RAM, ROM, DRAM, or Flash) for processing signals exchanged with the transceiver 17 and for controlling general operations of the communication device 10. The communication device 10 can alternatively or optionally include additional antennas at different locations such as a side antenna 16 that can be a receive antenna in the range of 2100 MHz to supplement and extend the bandwidth of the top antenna 12, which may only operate in the range of 1700 to 1900 MHz. Separately, the communication device can include a WLAN or Bluetooth antenna 19 in operational range of 2440 MHz for example. The communication device 10 can also include a GPS antenna 18 that operates in the range of 1575 MHz. As referred to herein, antennas optimized to operate in lower or low bands generally refers to antennas operating under 1000 MHz and antennas optimized to operate in higher or high band generally refers to antennas operating at or above 1700 MHz.

Figure 2:
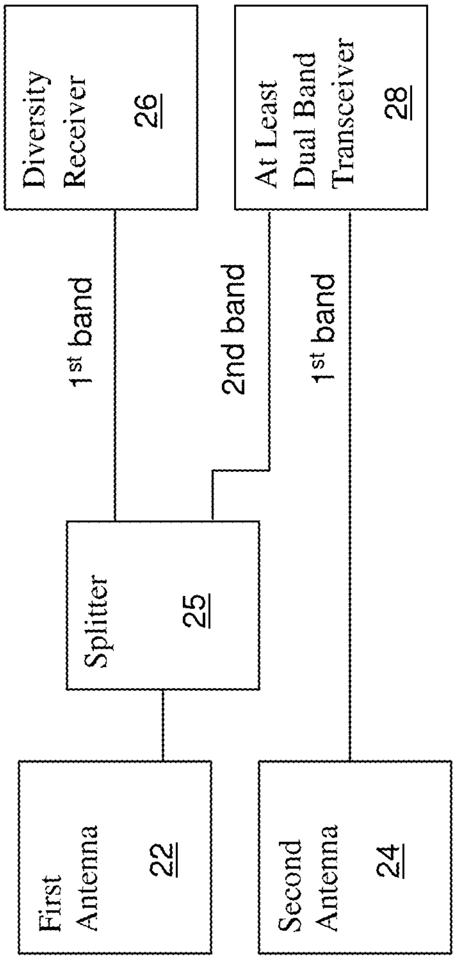
FIG. 2 depicts an embodiment of an antenna configuration using a splitter in accordance with the present disclosure.

Referring to FIG. 2, a wireless communication device or a split band diversity antenna arrangement 20 can include a first antenna 22 selectively coupled to a diversity receiver 26 and a multi-band transceiver 28, and a second antenna 24 coupled to the multi-band transceiver 28. A band splitter 25 splitting an input from the first antenna 22 into a first output and a second output can have the first output serve as an input to the diversity receiver 26 operating at a first band. The band splitter 25 can be one among a power splitter, a diplexor or a switch. The second output can selectively couple to at least the multi-band transceiver 28 in a second band. Advantageously, the first and second antenna are physically separate such that a user's hand is less likely to simultaneously cover, load, or interfere, than if the antennas were co-located.

Figure 3:
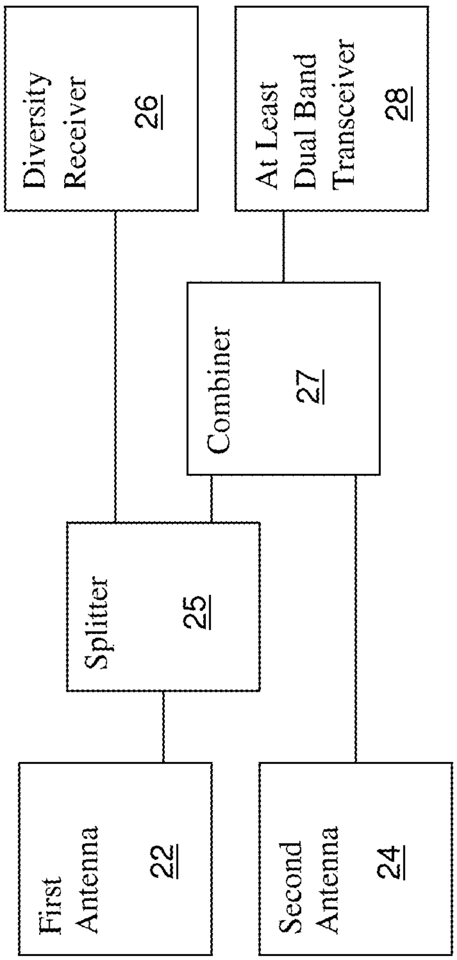
FIG. 3 depicts another embodiment of an antenna configuration using a splitter and combiner in accordance with the present disclosure.

Referring to FIG. 3, in a similar arrangement 21 to the arrangement 20 of FIG. 2, the device or arrangement 21 can also include a band combiner 27 that combines the second output of the band splitter 25 with the output of the second antenna 24 to provide an input signal to the dual band transceiver 28. The combiner 27 may be useful for providing a single connection to transceiver 28 for testing purposes. The band splitter 25 or the band combiner 27 or both can be one among a power splitter, a diplexor or a switch. The first antenna 22 (or 14) can be a dual band antenna located at a bottom portion (11 of FIG. 1) of the wireless communication device (10 or 20 or 21) and the second antenna 24 (or 12) can be a high band antenna located at a top portion (13 of FIG. 1) of the wireless communication device. Providing for the main transceiver a low band antenna location at the bottom of the phone and one or more high band antennas located at the top and side of the phone provides better radiation efficiency for the typical radio-telephone talking positions where the user head and hand reduces the antenna radiation. Given that other locations of the phone may already be occupied with additional antennas for WLAN, Bluetooth, GPS and the like, the bottom antenna advantageously serves to provide a high band diversity antenna function without occupying additional volume. Thus the antenna arrangements of FIGS. 2 and 3 are suitable for a transceiver with low frequency (e.g. 800 and 900 MHz) and high frequency (e.g. 1700, 1800, 1900 and 2100 MHz) operating bands, and a diversity receiver operating only in the high frequency bands.

Figure 4:
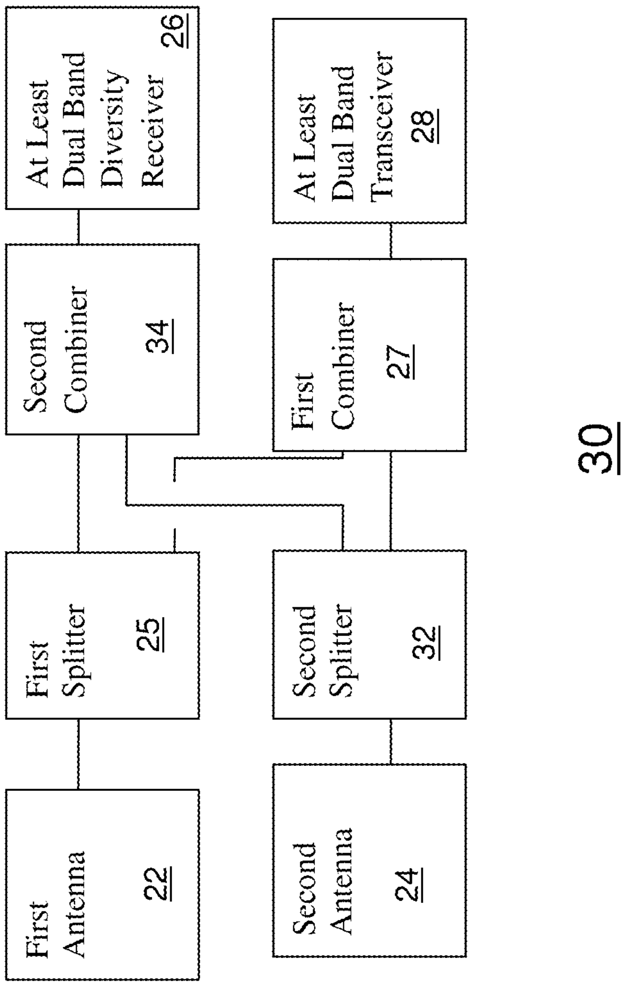
FIG. 4 depicts another embodiment of an antenna configuration using multiple splitters and combiners in accordance with the present disclosure.

In yet another alternative embodiment and referring to FIG. 4, a similarly configured wireless communication device or a split band diversity antenna arrangement 30 (similar to device 20 of FIG. 2 or device 21 of FIG. 3) can further include a second band splitter 32 having an input and a first and second output and a second band combiner 34 having a first input and a second input and an output. The first output of the second band splitter 32 can serve as an input to the second combiner 34 and a second output of the second band splitter 32 can serve as an input to the band combiner 27 and the output of the second band combiner 34 can serve as an input to the dual band transceiver 26. The output of the first combiner 27 can serve as an input to the dual band transceiver 28 as in communication device 20. Thus the antenna arrangement of FIG. 4 has the same advantages of the arrangements of FIGS. 2 and 3 with regard to antenna efficiency in the radio-telephone talking positions, and product volume utilization, and it is suitable for a diversity receiver operating the low frequency bands as well as the high frequency bands.

As noted with respect to FIG. 1, the communication devices or arrangements 20, 21 or 30 can further include a Bluetooth or WLAN antenna as well as a GPS antenna if desired. Note that the first antenna and the second antenna are separately located to provide spatial diversity in addition to the split band or frequency diversity. The wireless communication device 10 or 20 or 21 or 30 can operate to switch phone operation between bands associated with the separately located antennas based on hand grip loading imposed on the antennas. For example, if the transceiver 28 is operating with the first antenna 22 in a low band, and the user covers the first antenna with his hand, the network may sense a reduced transceiver signal level and perform a band-handover, thereby causing the transceiver 28 to change operation to a second antenna 24 in a high band. Thus, the arrangements disclosed provide better call drop performance on phones with at least dual band transceivers. Furthermore the split band diversity arrangement 20/21/30 provides further call drop performance advantages on phones with at least single band receiver diversity, while conserving product volume utilization by the antennas.

The split band diversity antenna arrangement is employed by phones which operate in at least two bands, with separately located antennas for each band. The design strategy can enable or be optimized for band handovers. In other words, since all antennas are subject to efficiency degradation due to hand grip, the separately located antennas as disclosed herein tend not to be affected simultaneously. When a grip causes loading on one of the antennas, the network will tend to switch phone operation to the band associated with the other antenna. This is sometimes referred to as the 'band handover' effect. To realize the full benefit of band-handovers, the embodiments herein provide separately located antennas serving at least two operating bands. Advantageously, the arrangement provides better volume utilization by employing multi-band antennas wherein the main transceiver antenna for a first band and diversity receiver antenna for a second band are provided by a single multiband antenna.

The positioning of the antenna can be arranged to be optimized for hand effects. Antennas located at the top or side of the phone or communication device tend to have less efficiency degradation due to a hand grip. For a given hand grip, the efficiency degradation is more severe in the higher frequency bands. Therefore the antenna serving the higher frequency band can be located at the top or side of the phone.

Accordingly, to provide physical separation between antennas to take advantage of the band handover effect, the low band antenna is positioned at the bottom of the phone. Furthermore, the positioning of the antennas can also be arranged to adjust Specific Absorption Rates or SAR. Antennas located at the bottom of a phone may have lower SAR. If the transmitter power is highest in one band, then the antenna serving the “higher power” band can be located at the bottom of the phone, so that SAR can be reduced to help meet government SAR regulatory requirements. Typically the transmitter power is highest in a low band. Therefore the antenna serving the lower frequency bands can be located at the bottom of the phone for reducing SAR as well as the afore-mentioned reason of providing physical separation from a high band antenna at the top or side of the phone.

The embodiments herein also use receiver diversity. Receiver diversity is a method of simultaneously employing two separately located antennas for improved receiver sensitivity. In one example, the diversity receiver 26 of FIGS. 2 and 3 can utilize the antenna 22 on the bottom portion of the communication device operating in the 1900 and 2100 MHz bands, while the transceiver 28 utilizes antenna 24 on the top portion of the communication device also operating in the 1900 and 2100 MHz bands. The separate side antenna 16 can also be considered part of the antenna 24 operating in the 1900 and/or 2100 MHz bands.

Note that diversity receivers are less effective for the low bands, and it is more difficult to fit a $2^{nd}$ low band antenna in the product. Thus the product designs may employ diversity for the high bands but not necessarily for the low bands.

Figure 5:
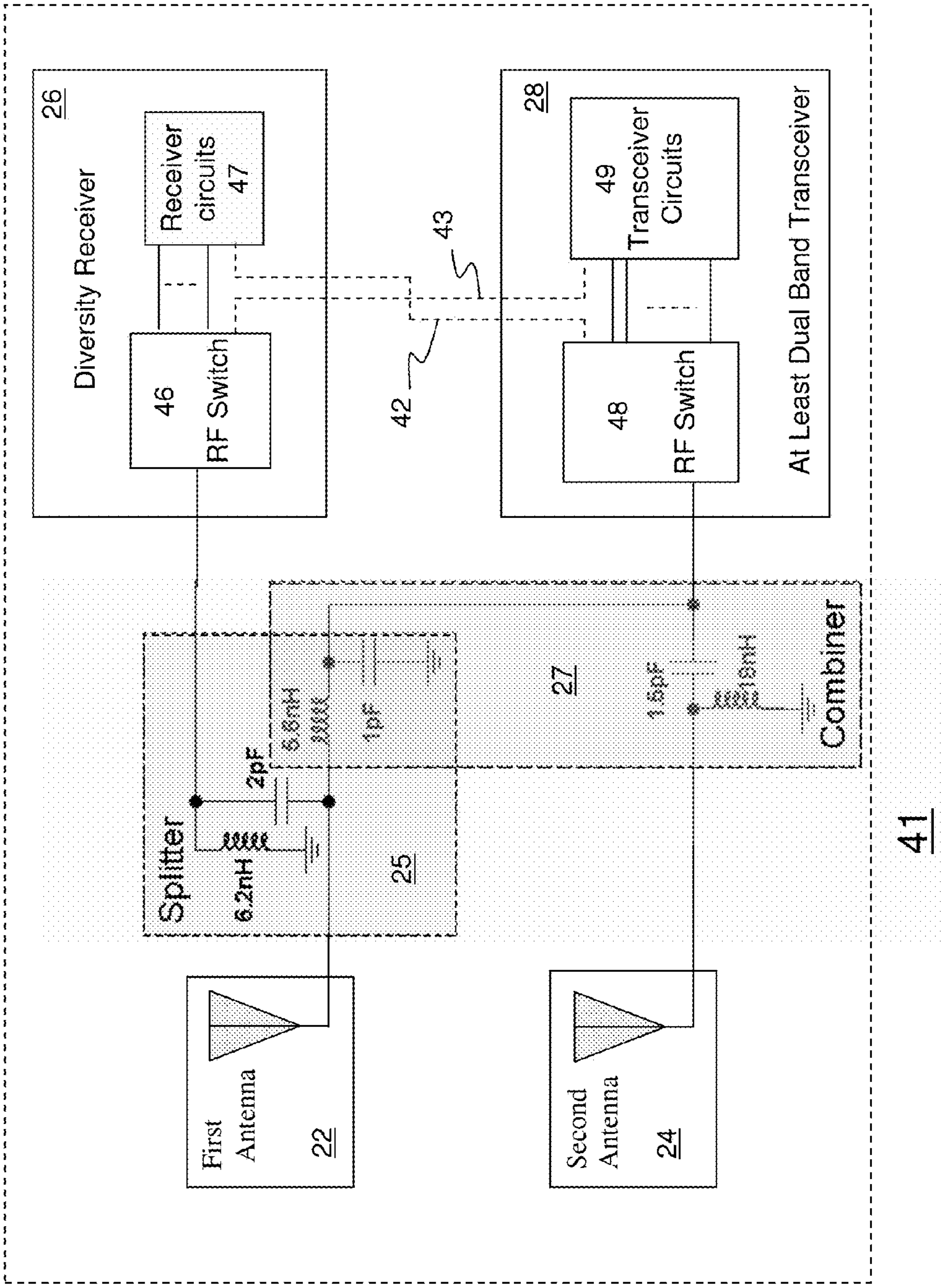
FIG. 5 depicts an alternative embodiment of a communication device of FIG. 5 in accordance with the present disclosure.

Many of the designs contemplated employ discrete L,C diplexors as illustrated in the antenna arrangement or communication device 41 of FIG. 5, but they are not necessarily limited thereto. An antenna feed schematic is illustrated in FIG. 5 including elements from FIG. 3 that are overlaid onto the schematic. The first antenna 22 can primarily serve the lower bands (850 and 900 MHz) and can be located at the “bottom” of the communication device as noted above to improve SAR performance. The second antenna 24 can include a top antenna that primarily serves the higher bands (1700, 1800, and 1900 MHz bands) located at a “top” portion of the communication device to optimize with respect to handgrip effects. The multi-band or at least dual band transceiver 28 can include a diversity RF switch 48 which serves to distribute the antenna signal into receiver and transmitter circuits 49 for each band. The diversity receiver 26 can include another RF switch 46 which serves to distribute the antenna signal into receiver circuits 47 for each band. Alternatively, RF switch 46 may distribute signals to transceiver circuits 49 as shown in phantom connection 42, and RF switch 48 may distribute signals to receiver circuits 47 as shown in phantom connection 43.

Figure 6:
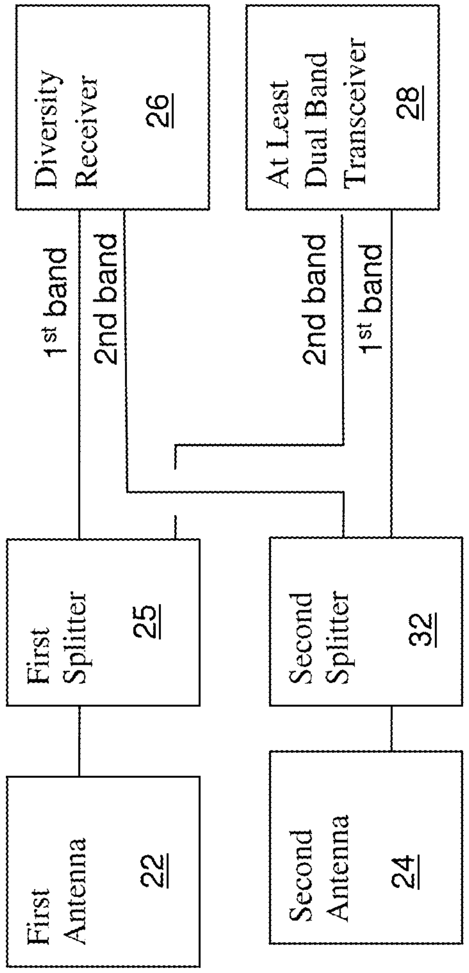
FIG. 6 depicts a diagram of a split band diversity antenna corresponding to the communication device of FIG. 5 in accordance with an embodiment of the present disclosure.

Referring now to FIG. 6 there is shown a similarly configured wireless communication device or a split band diversity antenna arrangement 50 (similar to device 30 of FIG. 4 or device 41 of FIG. 5). In this embodiment the splitters 25 and 32 comprise RF switches. The first RF switch 25 has an input connected to the first antenna 22 and a first and second output connected to the diversity receiver 26 and the main transceiver 28. The second RF switch 32 has an input connected to the second antenna 24 and a first and second output connected to the diversity receiver 26 and the main transceiver 28. Note that switches 25 and 32 may be the same components as RF switch components 46 and 48 of FIG. 5 which serve to distribute the antenna signal into receiver and transmitter circuits as shown in phantom connections 42 and 43 of FIG. 5. Thus the arrangement of FIG. 6 does not require additional combining circuits.

Figure 7:
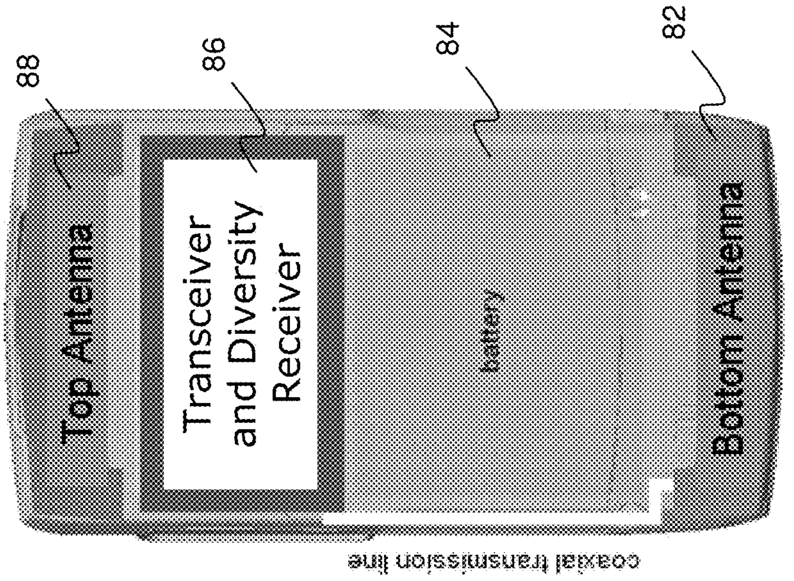
FIG. 7 depicts an embodiment of a communication device in accordance with the present disclosure.

Referring now to FIG. 7 there is shown yet another embodiment where a split band diversity antenna arrangement or communication device 80 includes a bottom antenna 82 coupled to a communication module 86 having a transceiver and a diversity receiver and a top antenna 88 also coupled to the communication module 86. The device 80 can be powered by a battery 84.

Figure 8:
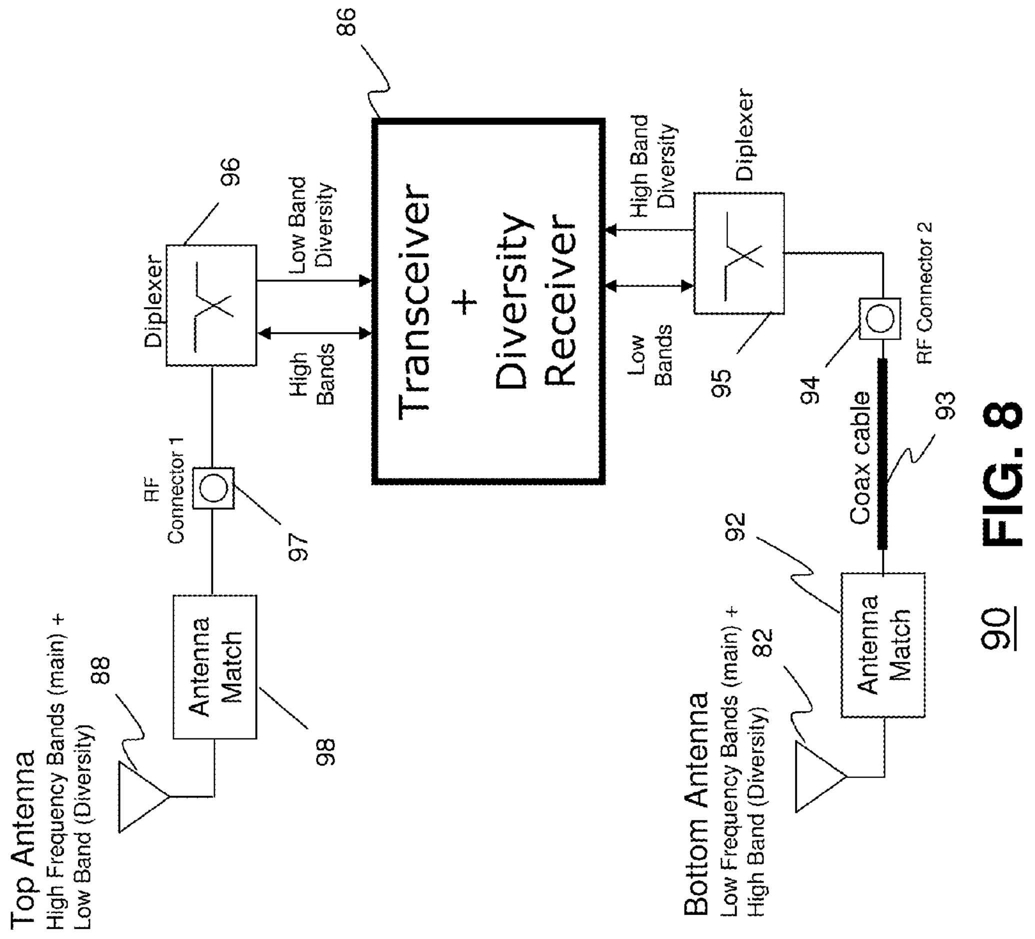
FIG. 8 depicts another representation of the communication device of FIG. 7, in accordance with the present disclosure.

Referring to FIG. 8, there is shown a block diagram of a split band diversity antenna arrangement or communication device 90 that can correspond to the physical device 80 illustrated in FIG. 7. The bottom antenna 82 can be optimized for use for low frequency bands for the transceiver and for high bands for the diversity receiver. An antenna matching circuit 92 provides the appropriate impedance for the antenna 82 taking into account a coaxial cable 93 coupled to an RF connector 94 which may be used to connect an external antenna or for testing the transceiver and diversity receiver 86. The antenna 82 provides (or radiates as appropriate) low frequency and high frequency band signals to or from the communication module 86 via the diplexer 95. A top antenna 88 can be optimized for use for high frequency bands for the transceiver and for low bands for the diversity receiver. An antenna matching circuit 98 provides the appropriate impedance for the antenna 88. The antenna 88 provides (or radiates as appropriate) low frequency and high frequency band signals to or from the communication module 86 via the diplexer 96 and RF connector 97 which may be used to connect an external antenna or for testing the transceiver and diversity receiver 86.

The configurations described herein can provide for a multi-element multi-band internal antenna arrangement that can cover multiple GSM or UMTS bands (850 MHz, 900 MHz, 1700 MHz, 1800 MHz, 1900 MHz and 2100 MHz for example) and both domestic and International WiMAX bands (2.5 GHz and 3.5 GHz). Thus, the antenna configurations described can serve as a quadband GSM triband UMTS antenna with diversity, or a quad-band GSM dual band WiMax antenna with diversity, or a Pentaband GSM/UMTS dual Band WiMax with diversity (or BlueTooth) antenna that can also separately include a GPS antenna for reception of GPS signals. While the split band antenna arrangement is described for use with a transceiver and diversity receiver, it may also be employed with a diversity transmitter or diversity transceiver arrangement.

In various switched arrangements, the split band diversity antenna arrangement 40 provides minimized return loss in various bands and maximized impedance. For example, in a bottom antenna match design, minimized return loss can be found in the 850, 900, 1900 and 2100 MHz bands. In a bottom antenna diplexor to main transceiver and diversity receiver design, the return loss at the main transceiver (28) is minimized in the low bands (850 and 900 MHz) and at the diversity receiver (26) in diversity bands (1900 and 2100 MHz) while the impedance at the main transceiver (28) in the high bands (1800, 1900, and 2100 MHz bands) are maximized. In a top antenna match design, the return loss in the 1800 and 1900 MHz bands are minimized while the impedance in the 2100 MHz band is maximized. In a side antenna match design, the return loss in the 2100 MHz band is minimized while the impedance in the 1800 and 1900 MHz bands are maximized. When the bottom, side and top antenna designs are combined in simulation, the combined design provides minimized return loss at the main transceiver in all band (850, 900, 1800, 1900, and 2100 MHz) and minimized return loss at the diversity receiver in diversity bands (1900 and 2100 MHz), and minimized isolation between the main transceiver and the diversity, that is between the first antenna 22 and second antenna 24.

The antenna arrangement(s) can be made either of a sheet metal or wires which can be insert molded with plastic using a 2-shot method, or made of metal plating on molded plastic. The antenna arrangement can comprise of any combination of loop antennas, folded dipoles, transmission lines, PIFA like elements, L-type stubs, slots or other arrangements that provide the desired band operations and the requisite diversity and performance under various hand grip scenarios.

The foregoing embodiments of the antennas illustrated herein provide a multiband antenna design with a wide operating bandwidth and reduced physical volume where desired. The specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The embodiments herein are defined solely by the appended claims including any amendments made during the pendency of this application and all equivalents of those claims as issued.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A wireless communication device, comprising:

a first antenna selectively coupled to a diversity receiver in a first band and to at least a dual band transceiver in a second band;

a second antenna selectively coupled to at least the dual band transceiver in the first band;

at least a first band splitter splitting an input from the first antenna into a first output and a second output, wherein the first output selectively couples to the diversity receiver, and the second output selectively couples to at least the dual band transceiver; and a band combiner that combines the second output of the band splitter with the output of the second antenna to provide a combined antenna signal which couples to the at least dual band transceiver.

2. The wireless communication device of claim 1, wherein the first band splitter and the band combiner each comprises at least one among a power splitter, a diplexor and a switch.

3. The wireless communication device of claim 1, wherein the first antenna is a dual band antenna located at a bottom portion of the wireless communication device and the second antenna is a high band antenna located at a top portion of the wireless communication device.

4. The wireless communication device of claim 1 further comprising an RF test connector connecting to the at least dual band transceiver.

5. The wireless communication device of claim 1, wherein the wireless communication device further comprises at least one of a Bluetooth antenna, Wireless Local Area Network (WLAN) antenna and a GPS antenna.

6. The wireless communication device of claim 1, wherein the wireless communication device comprises a Bluetooth or Wireless Local Area Network antenna and a GPS antenna.

7. The wireless communication device of claim 1, wherein the first antenna and the second antenna reside on a keypad board of the wireless communication device.

8. The wireless communication device of claim 1, wherein the first antenna and the second antenna are separately located and wherein the wireless communication device operates to switch phone operation between bands associated with the separately located antennas based on hand grip loading imposed on the antennas.

9. A wireless communication device, comprising:

a first antenna selectively coupled to a diversity receiver in a first band and to at least a dual band transceiver in a second band;

a second antenna selectively coupled to at least the dual band transceiver in the first band;

at least a first band splitter splitting an input from the first antenna into a first output and a second output, wherein the first output selectively couples to the diversity receiver, and the second output selectively couples to at least the dual band transceiver; and a second band splitter splitting an input from the second antenna into a first output and a second output, wherein the first output selectively couples to the diversity receiver in the second band, and the second output couples to the at least dual band transceiver in the first band.

10. The wireless communication device of claim 9, further comprising: a first band combiner that combines the second output of the first band splitter with the second output of the second band splitter to provide a combined antenna signal which couples to the at least dual band transceiver, and a second band combiner that combines the first output of the first band splitter with the first output of the second band splitter to provide a combined antenna signal which couples to the diversity receiver.

11. A split band diversity antenna arrangement, comprising: a first multi-band antenna located at a bottom portion of a wireless communication device and selectively coupled to a diversity receiver; a second multi-band antenna located at a top portion of the wireless communication device and selectively coupled to at least a dual band transceiver; a band splitter splitting an input from the first antenna into a first output and a second output, wherein the first output serves as an input to the diversity receiver; and a band combiner that combines the second output of the band splitter with the signal from the second antenna to provide an input signal to at least the dual band transceiver.

12. The split band diversity antenna arrangement of claim 11, wherein the first multi-band antenna is a dual band antenna operating in at least one of the band ranges among 800 MHz to 950 MHz and operating in at least one of the band ranges among 1700 MHz to 2100 MHz.

13. The split band diversity antenna arrangement of claim 11, wherein the band splitter and the band combiner each comprises at least one among a power splitter, a diplexor and a switch.

14. The split band diversity antenna arrangement of claim 11, wherein the arrangement further comprises a second band splitter having an input and a first and second output and a second band combiner having a first input and a second input and an output and wherein the first output of the second band splitter serves as an input to the second combiner and a second output of the second band splitter serves as an input to the band combiner and the output of the second band combiner serves as an input to the dual band transceiver.

15. The split band diversity antenna arrangement of claim 11, wherein the antenna arrangement further comprises a Bluetooth or Wireless Local Area Network antenna separate from the first and second antennas and a GPS antenna separate from the first and second antennas.

16. The split band diversity antenna arrangement of claim 11, wherein the first multi-band antenna and the second multi-band antenna reside on a keypad board of the wireless communication device.

17. The split band diversity antenna arrangement of claim 11, wherein the first multi-band antenna and the second multi-band antenna are separately located and wherein the wireless communication device operates to switch phone operation between bands associated with the separately located antennas based on hand grip loading imposed on the antennas.

18. A communication device, comprising: a split band diversity antenna arrangement; a communication circuit coupled to the split band diversity antenna arrangement; and a controller operable to cause the communication circuit to process signals associated with a wireless communication system, and wherein the split band diversity antenna arrangement comprises: a first antenna coupled to a diversity receiver optimized for operation in at least a lower band under a 1000 MHz range, wherein the first antenna is located at a bottom portion of the communication device; a second antenna coupled to a dual band transceiver and designed and constructed to operate in at least a non-contiguous higher band than the first antenna, wherein the second antenna is located remote from the first antenna and at a top portion of the communication device; a band splitter splitting an input from the first antenna into a first output and a second output, wherein the first output serves as an input to the diversity receiver; and a band combiner that combines the second output of the band splitter with a signal from the second antenna to provide an input signal to the dual band transceiver.

19. The communication device of claim 18, wherein the controller is operable to cause the communication device to switch operation between bands associated with the separately located antennas based on a hand grip loading imposed on the antennas as a user holds the communication device.

* * * * *